UNITED STATES PATENT OFFICE.

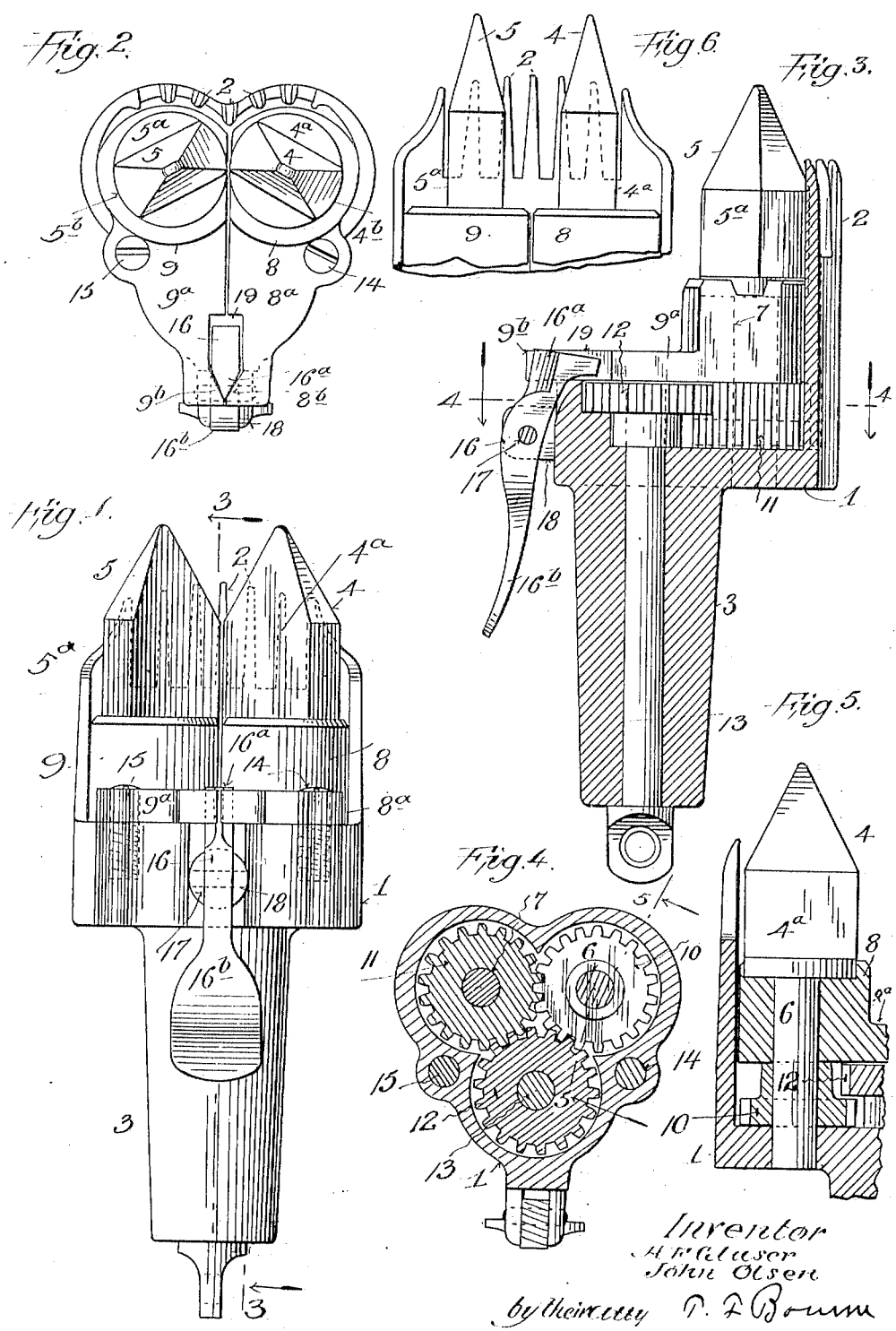

ADAM F. GLASER, OF JERSEY CITY, AND JOHN OLSEN, OF WHIPPANY, NEW JERSEY.

PLUCKING IMPLEMENT.

1,315,829.  Specification of Letters Patent.  Patented Sept. 9, 1919.

Application filed December 24, 1917. Serial No. 208,545.

*To all whom it may concern:*

Be it known that we, ADAM F. GLASER, a citizen of the United States, and resident of Jersey City, Hudson county, New Jersey, and JOHN OLSEN, a citizen of the United States, and resident of Whippany, Morris county, New Jersey, have invented certain new and useful Improvements in Plucking Implements, of which the following is a specification.

The object of our invention is to provide an implement adapted to pluck feathers from poultry, birds and all kinds of feathered creatures in an expeditious and efficient manner, to overcome the necessity for manual plucking of feathers heretofore practised, and reduce the cost of plucking.

In carrying out our invention we provide a suitable support upon which opposing movable plucking members are carried, adapted, when moved among the feathers of a chicken or other feathered creature to be plucked, to pull out the feathers as the implement is moved along among the feathers. In a preferred form of our invention we provide the support with a comb or comb-like guard adapted to pass close to the flesh and among the roots of the feathers of the fowl, bird or the like, over which comb or guard opposing oppositely rotative plucking members operate adapted to receive the feathers therebetween to pull them from the flesh as the implement progresses through the feathers.

Our invention comprises novel details of improvement and combinations of parts that will be more fully hereinafter set forth and then pointed out in the claims.

Reference is to be had to the accompanying drawings forming part hereof, wherein, Figure 1 is a face view of a plucking implement embodying our invention; Fig. 2 is an end view thereof, looking at the top of Fig. 1; Fig. 3 is an enlarged cross section substantially on the plane of the line 3, 3, in Fig. 2; Fig. 4 is a cross section substantially on the line 4, 4, in Fig. 3; Fig. 5 is an enlarged detail section on the line 5, 5, in Fig. 4; Fig. 6 is a detail face view showing the plucking members in feather releasing position.

Our improved implement is provided with a support or frame 1 of any suitable construction, shown having a forwardly extending guard, comb or comb-like portion at 2 to pass close to the skin and through the feathers of a feathered creature, such as a fowl, bird or the like. Said support is also shown having a rearwardly extending hub 3, which may be utilized as a handle for manipulating the implement. At 4, 5, are opposed plucking members shown located over the guard or comb and rotatively supported adjacent to one another. Said members are shown at their feather-plucking portions as relatively thin and narrow at $4^a$, $5^a$, and curved along their coöperative plucking surfaces or peripheries at $4^b$, $5^b$, whereby when said parts $4^b$, $5^b$ approach and coincide (Figs. 1 and 2), the feathers will be gripped therebetween, and when the members 4, 5, are turned so that their narrow sides $4^a$, $5^a$ coincide or oppose said surfaces $4^b$, $5^b$ will separate to release the feathers, (Fig. 6). The members 4, 5, are shown provided with shafts 6, 7, journaled respectively in bearings 8, 9, carried by support or frame 1. The shaft 6 is shown provided with gear 10 meshing with a gear 11 secured to shaft 7, and the gear 11 is shown in mesh with a gear 12 secured to a drive shaft 13 journaled in hub 3, whereby when shaft 13 is rotated the members 4, 5, will be rotated simultaneously, but in opposite directions. The gear 11 is shown of about double the thickness of gear 12, the latter being in mesh with the forward portion of gear 11 (Fig. 3) and the gear 10 is of such thickness as to mesh with gear 11, but not to mesh with gear 12, being set rearwardly of the latter (Fig. 5). By the means described the gear 12 may be disposed centrally in support or frame 1, and with respect to shafts 6, 7, of the plucking members in a compact manner for driving said members in opposite directions.

Since feathers are of varying thickness and closeness on different poultry, birds and the like, we provide means to vary the distance between the members 4, 5, as occasion may require. For such purpose we have shown the bearings 8, 9, as movably supported upon support 1, to be moved toward and from one another to correspondingly move plucking members 4, 5. The bearings 8, 9, are shown provided with extensions $8^a$, $9^a$ shown projecting at right angles to the shafts 6, 7, respectively, and pivotally supported upon support or frame 1 by screws or the like 14, 15, which respectively pass through holes in the extensions $8^a$, $9^a$ and mesh in threaded apertures in support 1, whereby the bearings may rock or oscillate on such screws, and whereby the bearings are retained in position on support 1. At 16 is an operating member for actuating the extensions 8ª, 9ª, being shown in the form of a lever pivotally supported at 17 upon lug 18 on support 1. The forward end portion of member 16 is shown tapering or oppositely beveled at 16ª (Fig. 2) and fitted between adjacent substantially correspondingly shaped faces 8ᵇ, 9ᵇ of the extensions 8ª, 9ª, said end portion of member 16 being movable in a recess 19 between the opposing adjacent faces of extensions 8ª, 9ª (Fig. 2). The free end portion 16ᵇ of member 16 is in position to be actuated by the thumb or finger of the operator in the normal operation of the device. The thicker feathers between the plucking faces 4ᵇ, 5ᵇ of members 4, 5, will tend to spread said members and cause the outer ends of the extensions 8ª, 9ª to approach the beveled or tapered portion 16ª of member 16, but if thinner feathers are encountered by the members 4, 5, the operator may press upon the end 16ᵇ of member 16 to cause its tapered or beveled end 16 to move between the faces 8ᵇ, 9ᵇ of extensions 8ª, 9ª to spread such faces apart and thereby cause the bearings 8, 9, with the members 4, 5, to approach to grip the thinner feathers between the faces 4ᵇ, 5ᵇ.

In using our improved implement it may be held in the hand and while its shaft 13 is rotated, as by connection with a flexible shaft operated from any suitable driving source of power, the implement may be moved along the skin of the fowl, bird or the like, the guard or comb sliding along the skin, while the feathers enter between the rotative members 4, 5, and as their cooperating surfaces 4ᵇ, 5ᵇ approach they will grip the feathers and pull them from the skin. It is, therefore, merely necessary, for instance, to push the implement along among the feathers, while the members 4, 5 rotate, to cause expeditious and accurate plucking of the feathers, so that by pushing the instrument along among the feathers in suitable successive movements, the feathered creature may be readily and accurately plucked, and quicker than can be done by the usual method of plucking feathers directly by the fingers of the operator. The guard serves to hold back the skin while the feathers are being plucked therefrom, to prevent the skin from being raised and torn.

While we have illustrated and described a particular embodiment of our invention in a compact and simple form, it will be understood that our invention is not limited to the details of construction and arrangement of parts set forth, as the same may be varied, within the scope of the appended claims, without departing from the spirit of the invention.

Having now described our invention what we claim is:—

1. A plucking implement comprising a support having a pair of opposing plucking members adapted to grip and release feathers of a feathered creature, bearings for said members, means to operate said members, means movably supporting the bearings on the support, extensions from said bearings movably carried by said support, and an operating member coöperative with said extensions to cause said bearings and members to approach and recede.

2. A plucking implement comprising a support having a pair of opposing plucking members adapted to grip and release feathers of a feathered creature, bearings for said members, means to operate said members, means movably supporting the bearings on the support, extensions from said bearings movably carried by said support, said extensions having inclined opposing surfaces, and a member movably carried by said support and having inclined surfaces to coöperate with the inclined surfaces of said extensions for causing the bearings and members to move relatively to one another.

3. A plucking implement comprising a support, opposing members having shafts, bearings on said support for said shafts, said shafts having gears in mesh, one of said gears being wider than the other, a driving gear in mesh with the wider of the first named gears, and a shaft for operating said driving gear.

Signed at Jersey City, in the county of Hudson, and State of New Jersey, this 16th day of October, 1917.

ADAM F. GLASER.
JOHN OLSEN.